April 16, 1963   A. R. ORSINGER ETAL   3,085,434
FLOATING ROOF TANK GAUGE
Filed Nov. 19, 1958
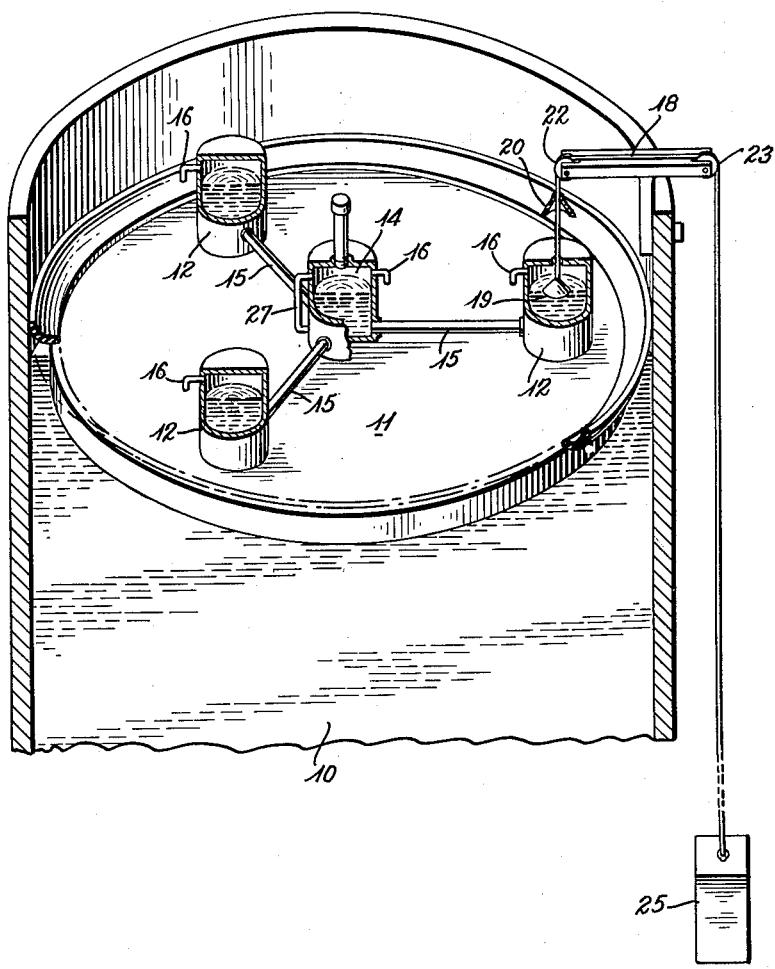
INVENTORS
Albert R. Orsinger and
Alvie Paul Williams
BY *Stevens, Davis, Miller & Mosher*
ATTORNEYS 本
United States Patent Office 3,085,434
Patented Apr. 16, 1963

3,085,434
FLOATING ROOF TANK GAUGE
Albert R. Orsinger and Alvie Paul Williams, Houston, Tex., assignors to Texas Instruments Incorporated, Dallas, Tex., a corporation of Delaware
Filed Nov. 19, 1958, Ser. No. 774,886
4 Claims. (Cl. 73—321)

The present invention relates to a novel gauge apparatus to be used in conjunction with a floating roof tank.

Gauging units have long been associated with tanks for the purpose of measuring the level of a bulk material, usually a liquid, contained within the tank. In the case of a tank having a fixed roof, the location and arrangement of the gauging unit poses no particular problem. Usually the unit is located adjacent one side of the tank and projects within the tank near its wall. One of the most common types of gauging units embodies a float principle.

In the case of a tank having a floating roof, problems are encountered in the location and arrangement of a gauging unit. It is widely known that floating roofs do not maintain a true horizontal or level position, due primarily to the friction between the roof shoes or gaskets on the periphery thereof and the wall of the tank. Other factors enter into this problem which are ancillary to the friction effect mentioned. In a tank having a 60 foot diameter, it is not uncommon for the roof to be off-level by as much as 8 or 10 inches. Nevertheless, it is considered imperative to be able to gauge the level of the contents of the tank to within 1/8 inch. Such gauging accuracy is easily achieved through the present invention.

Since the roof does not maintain a true horizontal position, it would be most advantageous to gauge the level of the bulk material contained within the tank by a unit which functions at the roof center. In a small tank, this is a possibility. In a large tank, however, of, for example, 60 foot diameter, it is impractical, from a structural standpoint, to arrange the gauging unit to function at the roof center. Therefore, it is customary in floating roof tanks to provide a well at some position in the floating roof, preferably near a wall. The material within the tank fills the well by means of a suitable opening at the bottom of the well and a float positioned within the well rides on the surface of the fluid contained therein. Since the well is located adjacent to a wall or the side of the tank, it is a relatively easy matter to mount the gauging unit to the tank wall.

The difficulty with the arrangement just described stems from the variations in roof weight that occur due to accumulation of snow, ice, dirt, rain water, or other foreign substances. When the roof weight changes, this in turn causes the roof to seek a new buoyant position. Shifting of the roof produces an hydraulic effect which is amplified by the ratio of the cross sections of the floating roof and the well. Thus, the level in the well will change due to the hydraulic effect and therefore gauge readings will include substantial error.

It is a principal object of the present invention to provide a novel system and apparatus for gauging the level of fluids contained within a tank of the floating roof type. More particularly, the invention is uniquely designed whereby the problems referred to above will be solved and an accurate measurement will be obtained of the level of fluid contained within the tank.

This is essentially accomplished by using a fluid equalization system employing a plurality of container units symmetrically disposed about the roof center, preferably adjacent its periphery. A fixed quantity of fluid is placed into the container units which are interconnected, preferably through a central fill pipe. A float is arranged to cooperate with one of the containers located on the periphery of the floating roof and a gauging unit cooperates with the float. In accordance with this arrangement, an indication of tank level is obtained to an exceedingly high degree of accuracy.

It is a further object of the present invention to provide a floating roof tank gauging apparatus characterized by simplicity and reliability of operation.

Other and further objects of the present invention will become more readily apparent from the following detailed description of a preferred embodiment of the present invention when taken in conjunction with the drawing which shows schematically the apparatus of the present invention and the unique method for obtaining highly accurate measurements of the level of a fluid contained within a tank of the floating roof type.

Referring now to the drawing, a preferred embodiment of the present invention will now be described in detail. There is illustrated a tank 10 having a floating roof 11. It will be appreciated that there are many arrangements for locating a roof in floating position with respect to a tank. In order to simplify the description of the present invention, details of a cooperative relationship have been omitted. It will be understood, however, that such details are always present and may take any form known in the art. Positioned on the floating roof 11 are three containers 12. They are located adjacent the periphery of the roof 11 and are symmetrically spaced at approximately 120° intervals with reference to the geometric center of roof 11. There is also mounted on the roof 11 a fill pipe 14 located substantially at the center of the roof 11. Each of the containers 12 is interconnected by means of a pipe 15 with the central fill pipe 14. The pipes 15 connect with the various containers adjacent their bottoms. Each container 12 and fill pipe 14 also includes a short vent pipe 16. Each of the containers have the same constant area throughout the portion of the respective container that the level of fluid to be introduced therein is subject to fluctuation. The common level of fluid in the containers will always remain a constant height above the level of the liquid in the tank. Stated otherwise, the common level of fluid in the containers will always remain a constant height above the geometric center of the floating roof, regardless of the tilt of the roof.

One of the containers 12 defines an aperture in its top cover through which passes a cable 18. Attached to the end of cable 18 within the container 12 is a float 19. A rain shield 20 is attached to the cable 18 at a position spaced above the top of container 12. The spacing must be such as to allow the float 19 to go to the bottom of the container 12 freely without obstruction. The cable 18 passes over pulleys 22 and 23 to a suitable gauge take-up and read-out unit 25. The unit 25 may take any form, and for the purposes of the present invention is merely shown as a block. Any of the known forms of apparatus suitable for this purpose may be employed.

The fill pipe 14 is provided with a sight glass 27, as shown, in order to assist in maintaining the level of liquid within the system substantially constant.

A predetermined quantity of fluid is introduced into the system comprising the three containers 12, fill pipe 14, and the interconnecting pipes 15. Since all the containers 12 are interconnected, the fluid in the system will seek the common level. Thus the float 19 located in the container 12 will always assume a position directly related to the position of the center of the roof 11. This result accrues because of the symmetrical arrangement of the containers 12 with respect to the geometric center of the roof 11 and the interconnections 15 which allow equalization of levels in the containers 12. Since the level gauge unit, the float 19, measures the position of the equalized surface level, this is an indication of the virtual level of the material in bulk storage in tank 10.

Although the invention has been shown and described in terms of a specific preferred embodiment, it will be appreciated that changes may be made which do not in truth depart from the inventive concepts. For instance, whereas three containers 12 have been illustrated, it will be appreciated that any number may be employed greater than one provided they are arranged in a symmetrical order with respect to the geometric center of the roof 11. Likewise, the use of the center fill pipe 14 is a preferred convenience, and it is possible for the invention to function merely by using containers 12 without including a central container. Other changes and variations will appear obvious to those skilled in the art from a knowledge of the teachings of the present invention. Such changes and modifications are deemed to be within the true scope of the invention.

What is claimed is:

1. A gauging system for a tank of the floating roof type, comprising a plurality of containers symmetrically disposed on the floating roof with respect to the geometric center of the floating roof, means interconnecting said containers for fluid communication so that fluid held within said containers will seek a common level, said plurality of containers each having the same constant area throughout the portion of the respective container that the level of fluid contained therein is subject to fluctuation, and means cooperating with one of said containers for determining the level of fluid contained therein with respect to said tank.

2. The system of claim 1 wherein three containers are disposed at 120° intervals about the periphery of the floating roof.

3. The system of claim 1 wherein a central fill pipe is located substantially at the center of the floating roof and is interconnected with the containers disposed on the floating roof.

4. A gauging system for a tank of the floating roof type comprising a plurality of containers symmetrically disposed on the floating roof with respect to the geometric center of the floating roof, a fluid in said containers, means interconnecting said containers for fluid communication so that said fluid held within said containers will seek a common level, said plurality of containers each having the same constant area throughout the portion of the respective container that the level of fluid contained therein is subject to fluctuation, and means cooperating with one of said containers for determining the level of said fluid contained therein with respect to said tank.

References Cited in the file of this patent

UNITED STATES PATENTS

| 2,210,159 | Averill | Aug. 6, 1940 |
| 2,532,883 | Bennett et al. | Dec. 5, 1950 |
| 2,587,526 | Quist | Feb. 26, 1952 |
| 2,841,009 | Mayes | July 1, 1958 |

FOREIGN PATENTS

| 934 | Great Britain | 1911 |